United States Patent [19]

Friend

[11] 4,226,918
[45] Oct. 7, 1980

[54] RUBBER ADHERENT TERNARY CU-ZN-NI ALLOY COATED STEEL WIRES

[75] Inventor: Raymond A. Friend, Niles, Mich.

[73] Assignee: National-Standard Company, Niles, Mich.

[21] Appl. No.: 930,799

[22] Filed: Aug. 3, 1978

[51] Int. Cl.³ ............................................. B32B 15/18
[52] U.S. Cl. ..................................... 428/676; 152/359; 308/127; 308/174; 428/625; 428/465; 428/457
[58] Field of Search ............... 428/624, 625, 658, 659, 428/676, 677, 457, 465, 466; 152/359; 308/127, 174; 204/44

[56] References Cited

U.S. PATENT DOCUMENTS

| 2,154,834 | 4/1939 | DeLametter | 428/625 |
|---|---|---|---|
| 2,563,113 | 8/1951 | Hindin et al. | 428/677 |
| 2,746,135 | 5/1956 | Harris | 428/677 |
| 2,939,207 | 6/1960 | Adler | 428/625 |
| 3,490,125 | 1/1970 | Frieling, Jr. | 428/677 |
| 3,749,558 | 7/1973 | Dillenschneider | 428/677 |
| 3,858,635 | 1/1975 | Nakamoto et al. | 428/625 |
| 3,961,740 | 6/1976 | Nakamoto et al. | 428/625 |
| 4,068,041 | 1/1978 | Swarts et al. | 428/625 |
| 4,096,009 | 1/1978 | Yoshida | 428/625 |

OTHER PUBLICATIONS

Van Ooij, W. J. "Mechanism of Rubber-to-Brass Adhesion" presented to 112th meeting of Rubber Division of A.C.S. 10/4-7/77.
Butrymowicz, D. B. Diffusion Rate Data and Mass Transport Phenomena for Copper Systems" N.B.S. Washington, D.C. p. 203 (7/77).
Haemers, G., et al., "The Role of the Brass Surface Composition with Regard to Steel Cord Rubber Adhesion" Speurwerk en Ontwikkeling (8/77).
Faust, C. L., et al., "The Electrodeposition of Copper, Nickel and Zinc Alloys from Cyanide Solutions I, *The Electrochemical Society* pp. 267-281(1934).
Faust, C. L. et al., "The Electrodeposition of Copper, Nickel and Zinc Alloys from Cyanide Solutions II", The Electrochemical Society pp. 299-315 (1935).
Faust, C. L., et al., "The Electrodeposition of Copper-Nickel-Zinc Alloys from Cyanide Solutions"III, *The Eletrochemical Society* pp. 11-25. (1938).

*Primary Examiner*—L. Dewayne Rutledge
*Assistant Examiner*—Michael L. Lewis
*Attorney, Agent, or Firm*—Emrich, Root, Lee, Brown & Hill

[57] ABSTRACT

A ferrous wire having a homogeneous coating deposited on the wire, with the homogeneous coating comprised of between about 0.3-5.0% by weight of nickel, 60-75% by weight of copper and 40-25% by weight of zinc. The homogeneous coating comprises between about 0.3-16.0 grams of coating per kilogram of ferrous wire and coating. The coated ferrous wire is adapted to provide increased and superior precured humidity aged adhesion and postcured steam-aged adhesion to rubber based products such as tires, hose and belts.

5 Claims, No Drawings

RUBBER ADHERENT TERNARY CU-ZN-NI ALLOY COATED STEEL WIRES

BACKGROUND OF THE INVENTION

Within the past several years the development of ferrous wire reinforced rubber based products such as tires, hose and conveyor belts has become prominent. With these developments, the aged adhesion between the metallic wire and the vulcanized rubber based material has become of critical importance.

Previous attempts to improve the adhesion between the metallic wire and the rubber based material have included coating the metallic wire with brass, a binary alloy composed of copper and zinc. Although brass coated metallic wire is probably the most widely used material in the rubber tire industry, surface phenomenon occuring between the brass coated wire and the rubber based material have prevented brass coated wire from having wide spread application within the tire industry and from having wide spread application with respect to various rubber based compositions and materials. For example, it is believed that moisture and oxidation phenomenon on the surface of the brass coated metallic wire cause adverse effects upon the aged adhesion of rubber to the metallic surface.

Accordingly, various attempts have been suggested to improve the adhesion between the rubber based material and the metallic surface such as the utilization of organic adhesive materials on the brass surface, the utilization of thin films of metals on the surface of the brass, and the utilization of thin films of metals between the metallic wire and the brass outer surface to somehow increase and aid in the adhesion between the metallic wire and the rubber based material.

Although such suggestions and attempts may under certain conditions provide adequate adhesion between the metal substrate material and a specific rubber based composition, commercial application of such suggestions have not been utilized. For example, the composition of the rubber based materials, such as rubber tire compositions, are largely proprietary to the major rubber companies and the specific identification of the composition thereof vary from manufacturer to manufacturer. Thus, a particular treated metal substrate may adhere well with a particular manufacturer's rubber based composition and the same material will not adhere well to a second manufacturer's rubber based composition. Additionally, the placing of a thin film of any number of specific metals on the outside surface of the brass coated steel wire or between the steel and the brass coating has substantially reduced the ability of such treated wires to be drawn to the precise specifications necessary for insertion into tire materials, thus resulting in a metallic substrate material which is commercially undesirable and unacceptable.

SUMMARY OF THE INVENTION

It is one object of the present invention to deposit on a ferrous wire a homogeneous alloy coating comprised of between about 0.3–5.0% by weight of nickel, 60–75% by weight of copper and 40–25% by weight of zinc which possesses increased precured-humidity aged adhesion and postcured steam aged adhesion between the coated ferrous wire and a rubber based material.

It is a further object of the present invention to provide a ferrous wire having a homogeneous alloy coating comprised of nickel, copper and zinc which is especially adapted to provide increased and superior aged adhesion to rubber based materials.

It is still another object of the present invention to provide a ferrous wire having a homogeneous coating comprised of nickel, copper and zinc which is adapted to be drawn between 10 and 95% total reduction in cross-sectional area from the homogeneously alloy coated ferrous wire.

It is still another object of the present invention to provide a composite of a vulcanized rubber based material and a metallic surface having superior precured humidity aged adhesion properties.

It is yet another object of the present invention to provide a method for producing a ferrous wire having a homogeneous alloy coating comprised of nickel, copper and zinc.

In accordance with the present invention, a ferrous wire, such as a carbon steel wire, possessing superior precured humidity aged adhesion to rubber based material such as tire, hose, and conveyor rubbers, is obtained by electrically depositing a homogeneous alloy coating comprised of between about 0.3–5.0% by weight nickel, 60–75% by weight copper and 40–25% by weight zinc. The homogeneous coating comprises between about 0.3 and 16.0 grams per kilogram of the coating and wire combined.

The ferrous wire is prepared for depositing of the homogeneous coating by drawing the ferrous wire to approximately 0.04 inch in diameter and then thermally softening the wire by patenting, as is well known in the art. After the material is thermally softened, the wire is cleaned with a pickling agent and then immersed in an electrolytic bath containing copper and zinc cyanide, and anodes, generally in the form of brass. Additionally, the cyanide bath contains a nickel salt therein to permit the homogeneous depositing of an alloy coating of nickel, copper and zinc on the ferrous wire passing through the bath. For the purpose of maintaining nickel in the bath, nickel may be added in the form of a nickel salt (such as nickel carbonate), in the form of a nickel anode, or in the form of a copper-nickel-zinc anode.

After the homogeneous coating is deposited upon the ferrous wire, the coated wire is readily drawn to approximately 0.030–0.004 inch in diameter, as is well known in the art. The wire is then, preferably stranded and twisted together to provide tire cord wires or used as drawn for hose wires, to provide a wire possessing superior precured humidity-aged adhesion and postcured steam-aged adhesion when combined with rubber based compositions. Alternatively, tire bead wire (usually round in cross section) may be produced by drawing a ferrous wire to final size (usually nominally between about 0.035 and 0.08 inch in diameter) by conventional means, cleaning with a pickling agent and then immersing in an electrolytic bath as above to permit the homogeneous deposition of an alloy coating of nickel, copper and zinc onto the ferrous wire passing through the bath.

Thus, it has been determined that a homogeneous coating of a ternary alloy containing copper, nickel and zinc uniformly provides superior precured humidity-aged adhesion and postcured steam-aged adhesion than previously thought possible. Although the mechanism or chemistry involved in this increased and superior precured humidity aged adhesion and postcured steam-aged adhesion is not understood, it is believed that the conditions of the aging tests do not affect the surface of the copper-zinc-nickel homogeneous alloy as occurs with commonly metal-coated ferrous wire.

DETAILED DESCRIPTION

In accordance with the present invention, a ferrous wire, such as a carbon steel wire, is prepared to have application in the reinforcement of rubber base products such as tires, hose and belts. The ferrous wire is treated with a homogeneous alloy coating to provide increased and superior precured humidity-aged adhesion and postcured steam-aged adhesion between the coated ferrous wire and the rubber based composition, as will hereinafter be described.

The adhesion of rubber to reinforcing wire or strands twisted from multiple wires is a property of primary importance in the end use of rubber-reinforced articles such as tires, hoses and conveyor belts. Generally, two standardized test procedures are widely used: ASTM Standard Method #D-2229 (for tire cord) and ASTM Standard Method #D-1871 (for tire bead wire). Both tests generally involve placing the wire to be evaluated in a mold containing rubber applying heat and pressure for an appropriate amount of time to cure the particular rubber compound. After curing, the rubber-wire composite is positioned in a standard fixture and the wires are subjected to an increasing tensile load until the wires are pulled out of the composite. It is generally believed that a high percentage of wire surface retaining adhered rubber after being pulled from the primary rubber body (for tire cord) and that a high force or load at which the wire are pulled out of the rubber (for tire cord and tire bead wire) are indications of good adhesion. Moreover, such evaluations are equally applicable to rubber hose and belt materials.

More recently, a number of non-standardized test procedures have been used to evaluate adhesion that results from exposing the uncured rubber-wire composite to moisture and heat before curing. In this case, of precured humidity-aged rubber adhesion testing, the rubber-wire composite is often exposed to humidity in the range of 80–100% at temperatures of between room temperature and 80° C. for periods of one to fourteen days after molding, but prior to curing. After the humidity-aging, the rubber-wire composite is cured by applying appropriate heat and pressure for the appropriate time and then tested in the manner as set forth above with respect to the ASTM tests. Both load and rubber coverage are observed as before. Thus, the precured humidity-aged rubber adhesion testing is important because it is indicative of the shelf-life of the wire, the shelf-life of the rubber compound, and is indicative of the shelf-life of the molded rubber-metal-reinforced articles such as tire, hose and belts.

Other non-standardized test procedures have been used to evaluate adhesion resulting from exposure of the cured rubber wire composite to hot steam after curing. In this case, of postcured steam-aged adhesion testing, the cured rubber-wire composite is exposed to steam at temperatures between 100° C. and 150° C. for periods of a few hours to several days. After steam aging, the rubber-wire composite is tested in the manner set forth above with respect to the ASTM tests. Such postcured steam-aged adhesion testing is important because it is indicative of service life of cured rubber products.

As is readily appreciated, many characteristics of the rubber compound itself (compositional characteristics, homogeneity, particle surface area) and characteristics of the wire surface (composition of plating, homogeneous plating, and surface residual films) are influential in obtaining good rubber-metal adhesion in general and precured humidity-aged rubber-metal adhesion or postcured steam-aged adhesion in particular.

For preparing the ternary alloy coating on a ferrous wire, a ferrous wire having a diameter of approximately 0.040 inch was manufactured by the usual practice and was then patented, by passing the wire through a conventional furnace. Next, the ferrous wire was passed through an acid pickle containing hydrochloric acid and then a rinse prior to its entrance into the electrolytic-ternary alloy cyanide plating solution, which was controlled within the following general ranges;

Copper concentration: 25–100 g/liter
Zinc concentration: 2–10 g/liter
Sodium cyanide concentration: 20–60 g/liter (titrateable)
Sodium hydroxide concentration: 20–60 g/liter
Nickel concentration: 20–1000 mg/liter
Cathode current density: 10–30 amps/d$m^2$
Bath Temperature: 70°–90° C.
Immersion Time: Dependent upon thickness desired Subsequent to the electrolytic depositing of the ternary alloy onto the ferrous wire, the coated wire was then passed through a water rinse and a lubricant coating solution containing 100 grams per liter of borax and was then conventionally drawn through a series of dies to a final filament diameter of between 0.004 and 0.015 inch. Five of these wire filaments were then twisted together by conventional means to form a five wire strand for use as a rubber reinforcement.

EXAMPLE I

Four types of samples were made using appropriate combinations of the plating perimeters given above utilizing the electrolytic ternary alloy cyanide plating solution. Sample 1 was a ferrous wire on which was coated plain brass not containing any nickel. Sample 2 was plain brass plated over a distinct layer of nickel plate of 0.06 gram per kilogram of nickel. The nickel was plated prior to the brass plating from a conventional fluoborate solution containing 50 grams per liter of nickel, saturated cold with boric acid at a pH of 4.0 at 70° C., using a current density of 25 amps/dm² with 1.33 seconds immersion. Sample 3 was a ferrous wire plated with the ternary alloy containing copper, zinc and nickel in accordance with the present invention from the cyanide plating bath described above and containing a nickel salt. Sample 4 was a ferrous wire coated with brass containing a residual amount of nickel.

The compositions of the ferrous wire coatings and rubber-adhesion characteristics and properties are given in Table I. All data pertain to 5-wire strands composed of 5 wires having nominally 0.01 inch diameter.

The rubber compound designated A is a proprietary rubber compound commercially used by one of the major rubber manufacturers. The humidity aging conditions were two days at 38° C. and 95% relative humidity. The coating weight is expressed in terms of grams of plating per kilogram of plated wire. For Sample 2 the amount of nickel present is expressed as a percentage by weight of the sum of nickel and brass weights.

The data from Table I indicates a significant advantage in precured humidity-aged adhesion both in strength and coverage for the ternary alloy over plain brass and brass over a distinct layer of nickel equivalent to the concentration of the nickel in the ternary alloy. Also, Sample 4 represents plain brass containing residual nickel as an impurity or less than 0.1% by weight nickel. The data indicates that the homogeneous ternary alloy containing copper, nickel and zinc exhibit superior and increased aged strength and aged rubber adhesion than in conventional brass coated ferrous wires.

EXAMPLE II

Additional samples were prepared in order to evaluate the effect of nickel and copper concentrations in the plating on the ferrous wire with respect to the determination of precured humidity-aged rubber adhesion. Samples 5 and 6 were made from a bath of the type described above having a copper concentration of 66 weight percent of the alloy; Samples 7 and 8 were prepared with a copper concentration of apprixmately 64.6 weight percent of the alloy; Samples 9 and 10 were prepared with a copper concentration of nominally 62.5 weight percent of the alloy. Sample 12 contains 65.4 weight percent copper and Sample 11 is a comparison sample of a plain brass coating containing residual amounts of nickel. The plating weight and nickel contents are set forth in Table II together with the precured humidity-aged rubber adhesion data for a rubber compound B, a proprietary and commercially used rubber tire composition. The conditions of the humidity aging were 7 days at 38° C. and 98% relative humidity.

From the data in Table II, Samples 6, 8, 10 and 12 exhibit superior adhesion strength and superior humidity-aged rubber coverage percentages than available from existing brass coated ferrous wire or brass coated ferrous wire containing residual nickel. In all instances, the coating weight is expressed in terms of grams of plating per kilogram of plated wire.

EXAMPLE III

Several additional samples were evaluated for postcured steam-aged adhesion. In this evaluation the purpose was to compare the rubber adhesion after steam-aging for wires containing the homogeneous copper-nickel-zinc ternary alloy coating and commercial plain brass-coated wires. Both types of wires were in the form of 5-wire strand, each wire having a nominal diameter of 0.01 inch.

Sample 13 was a commercially available brass plated strand product. Sample 14 was plated with the homogeneous copper-nickel-zinc ternary alloy bath of the type described above to provide a homogeneous coating containing 1.4 percent by weight of nickel. The plating weights and compositional characteristics of the coatings are given in Table III together with postcured steam-aged rubber adhesion data for the rubber compound A. The conditions of steam aging were 5 hours at 110° C. with saturated steam.

From the data in Table III, Sample 14 exhibits superior postcured steam-aged rubber adhesion than commercial brass coated ferrous wire strands.

EXAMPLE IV

An additional sample was prepared to determine the usefulness of the homogeneous ternary copper-nickel-zinc alloy coating on a ferrous wire such as used in tire beads. Such bead wires normally are plated with a bronze plating (consisting nominally of 99 weight percent copper and 1 weight percent tin) deposited by a displacement bath containing copper and tin sulfate. The plating is done at finished size because the deposit does not undergo the wire drawing operation, as in the previous examples. The coating weight of the commercial bead wires is generally in the range of about 0.3 to 1.0 grams of coating per kilogram of plated bead wire and the wire diameter is normally about 0.038 inch. Accordingly, Sample 16 was prepared with a ternary alloy bath of the type described above using a ferrous wire of 0.038 inch in diameter. Sample 16 was compared as to unaged and precured humidity aged adhesion with a commercially available bronze plated bead wire of 0.038 inch in diameter—the commercially available bead wire, designed as Sample 15.

The compositions of the ferrous wire coatings and rubber-adhesion characteristics are given in Table IV. The rubber compound C is a proprietary and commercially used rubber material specifically used for tire beads. The humidity aging conditions were 2 days at 38° C. and 98% relative humidity.

From the data in Table IV, Sample 16, having a Cu/Ni/Zn alloy coating, exhibits superior adhesive strength than commercially available bronze coated tire bead ferrous wire when combined with a commercially available rubber compound.

From the data set forth above in Tables I and II and drawing tests, it is indicated that a ferrous wire having deposited thereon a homogeneous alloy coating comprised of about 0.3–5.0% by weight nickel, 60–75% by weight copper and 25–40% by weight zinc, exhibits superior drawing ability and excellent and increased precured humidity-aged adhesion between the coated ferrous wire and the rubber based material such as rubber tire compositions and rubber hose compositions. Also, it has been found that the drawability of such a wire from approximately 0.04 inch to between about 0.004–0.030 inch is excellent and that a coating weight of the homogeneous alloy may range from between about 0.25 to 16.0 grams per kilogram of the coating and wire combined.

Alternatively, tire bead wire (usually round in cross section) may be produced by drawing to final size (usually between about 0.035 and 0.08 inch in diameter) by conventional means, cleaning with a pickling agent and then immersing in an electrolytic bath as above to permit the homogeneous deposition of an alloy coating of nickel, copper and zinc onto the ferrous wire passing through the bath. In tire bead wire, the alloy coating is comprised of between about 0.25 to 1.25 gram by weight of coating per kilogram weight of the combined coating and wire.

What has been described hereinabove is that a homogeneous ternary alloy coating containing copper, nickel and zinc deposited upon a ferrous wire, produces a wire that is capable of being drawn to between about 10 and 95% of a total reduction in cross-sectional area, which wire possesses superior precured humidity-aged adhesion and postcured steam-aged adhesion than existing commercially used rubber compounds, than has heretofore been thought possible. It is well to point out that in the commercial application of ferrous tire bead wire to a tire rubber compound, it is generally not necessary to draw the wire after the deposition of the homogeneous alloy coating of the present invention. On the other hand, when the ferrous wire is utilized as a tire cord reinforcing material, it is economically preferable to deposit the homogeneous alloy coating of the present invention on the wire and then draw to final size. However, it is within the scope of the present invention to draw the ferrous wire to a final size and then deposit the homogeneous coating thereon. When the ferrous wire is utilized as a rubber hose or belt reinforcement, the homogeneous alloy coating may be either deposited prior to or subsequent to the drawing operation. Additionally, such a ternary alloy coating deposited on a ferrous wire that has been previously drawn to finished size yields a coated wire possessing superior precured humidity-aged adhesion characteristics than existing commercially used rubber compounds.

TABLE I

RUBBER-WIRE ADHESION RESULTS
(Tire Rubber Compound A)

| | | Metal Plating on Wire | | | Adhesion | | | |
|---|---|---|---|---|---|---|---|---|
| | | Coating weight (g/kg) | Copper conc. (wt. %) | Zinc conc. (wt. %) | Nickel conc. (wt. %) | Strength, (kg) | | Rubber Coverage, (%) |
| Sample | Designation | | | | | Unaged | Aged | Unaged | Aged |
| No. 1 | (Plain brass) | 3.6 | 66.7 | 33.3 | 0 | 59 | 34 | 100 | 50 |
| No. 2 | (Plain brass over Ni) | 3.2 | 68.4 | 29.4 | 2.2 | 36 | 27 | 30 | 5 |
| No. 3 | (Cu/Ni/Zn - alloy) | 4.0 | 66.7 | 31.7 | 2.6 | 51 | 39 | 100 | 80 |
| No. 4 | (Plain brass residual Ni) | 4.0 | 66.8 | 33.1 | 0.098 | 51 | 27 | 100 | 50 |

TABLE II

RUBBER-WIRE ADHESION RESULTS
(Tire Rubber Compound B)

| | | Metal Plating on Wire | | | | Adhesion | | | |
|---|---|---|---|---|---|---|---|---|---|
| | | Coating weight (g/kg) | Copper conc. (wt. %) | Zinc conc. (wt. %) | Nickel conc. (wt. %) | Strength, (kg) | | Rubber Coverage % | |
| Sample | Description | | | | | Unaged | Aged | Unaged | Aged |
| No. 5 | (Plain brass) | 4.9 | 66.0 | 34.0 | 0 | 56 | 25 | 100 | 20 |
| No. 6 | (Cu/Ni/Zn-alloy) | 5.0 | 66.0 | 33.0 | 1.0 | 45 | 33 | 90 | 90 |
| No. 7 | (Plain brass) | 4.6 | 64.7 | 35.3 | 0 | 56 | 22 | 100 | 10 |
| No. 8 | (Cu/Ni/Zn-alloy) | 4.0 | 64.5 | 35.0 | 0.5 | 53 | 31 | 100 | 55 |
| No. 9 | (Plain brass) | 4.2 | 62.7 | 37.3 | 0 | 55 | 22 | 100 | 30 |
| No. 10 | (Cu/Ni/Zn-alloy) | 3.9 | 62.3 | 35.8 | 1.9 | 45 | 33 | 90 | 90 |
| No. 11 | (Plain brass residual Ni) | 4.2 | 62.7 | 37.2 | 0.1 | 55 | 22 | 100 | 30 |
| No. 12 | (Cu/Ni/Zn-alloy) | 4.4 | 65.4 | 29.6 | 5.0 | 50 | 43 | 95 | 65 |

TABLE III

RUBBER-WIRE ADHESION RESULTS
(Tire Rubber Compound A)

| | | Metal Plating on Wire | | | | Adhesion | | | |
|---|---|---|---|---|---|---|---|---|---|
| | | Coating weight (g/kg) | Copper conc. (wt. %) | Zinc conc. (wt. %) | Nickel conc. (wt. %) | Strength, (kg) | | Rubber Coverage % | |
| Sample | Description | | | | | Unaged | Aged | Unaged | Aged |
| No. 13 | (Plain brass plate) | 6.2 | 68.1 | 31.9 | 0 | 57 | 50 | 90 | 85 |
| No. 14 | (Cu/Ni/Zn-alloy plate) | 4.0 | 65.6 | 33.0 | 1.4 | 54 | 57 | 100 | 100 |

TABLE IV

RUBBER-WIRE ADHESION RESULTS
(Tire Bead Rubber Compound C)

| | | Metal Plating on Wire | | | | | Adhesive Strength | |
|---|---|---|---|---|---|---|---|---|
| | | Coating Weight (g/kg) | Copper conc. (wt. %) | Zinc conc. (wt. %) | Nickel conc. (wt. %) | Tin Conc. (wt. %) | Unaged (lbs) | Aged (lbs) |
| No. 15 | (Plain bronze plate) | 0.7 | 99 | 0 | 0 | 1 | 194 | 178 |
| No. 16 | (Cu/Ni/Zn-alloy) | 0.95 | 65.8 | 32.9 | 1.3 | 0 | 263 | 277 |

We claim:

1. A ferrous wire for use as a reinforcement for rubber tires or rubber hose having a homogeneous alloy coating deposited thereon, said alloy coating comprised of between about 0.3-6.0% by weight of nickel, 60-75% by weight of copper and 40-25% by weight of zinc, with said homogeneous coating comprising of between about 0.25-16.0 grams by weight of coating per kilogram weight of the combined coating and wire.

2. The ferrous wire in accordance with claim 1 wherein said coated ferrous wire is drawable to a diameter of between about 0.004 to 0.030 inch.

3. A ferrous bead wire for use as a reinforcement for rubber tires, said bead wire having a homogeneous alloy coating deposited thereon, said alloy coating comprised of between about 0.3-6.0% by weight of nickel, 50-75% by weight of copper and 50-25% by weight of zinc, with said alloy coating comprising of between about 0.25-1.25 gram by weight of coating per kilogram weight of the combined coating and wire.

4. The ferrous bead wire in accordance with claim 3 wherein the diameter of said bead wire is between about 0.035 to 0.08 inch.

5. The ferrous wire in accordance with claim 1 wherein said coated ferrous wire is drawable to about 10-95% cross-sectional area of the coated ferrous wire.

* * * * *